United States Patent [19]

Dale et al.

[11] 3,928,386

[45] Dec. 23, 1975

[54] PROCESS FOR PREPARING CYCLIC POLYETHERS

[76] Inventors: Johannes Dale, Stasjonsveien 63, 1310 Bloomenholm; Gerd Borgen, Grinda 4, Oslo 8; Kari Daasvatn, Waerpen Gard, 3475 Saetre, all of Norway

[22] Filed: Jan. 3, 1974

[21] Appl. No.: 430,510

[30] Foreign Application Priority Data
Jan. 12, 1973 Norway.................................. 165/73

[52] U.S. Cl. .............................................. 260/338
[51] Int. Cl.² ........................................ C07D 323/00
[58] Field of Search..................................... 260/338

[56] References Cited
OTHER PUBLICATIONS

D. J. Worsfold et al., Jour. Am. Chem. Soc., Vol. 79 (1957) pp. 900–902.
R. J. Kern, Jour. Organic Chemistry, Vol. 33, No. 1, Jan. 1968, pp. 388–390.

*Primary Examiner*—Norma S. Milestone
*Attorney, Agent, or Firm*—Wenderoth, Lind & Ponack

[57] ABSTRACT

The invention relates to a process for preparing cyclic polyethers by oligomerisation of ethylene oxide in the presence of a catalyst, wherein the oligomerisation is carried out in the presence of an acidic inorganic fluoride and in the absence of compounds which can provide potential terminal groups.

8 Claims, No Drawings

PROCESS FOR PREPARING CYCLIC POLYETHERS

This invention relates to a new and valuable process for preparing cyclic polyethers.

In U.S. Pat. No. 3,562,295 macrocyclic polyethers of the general formula

in which $n = 5-10$ are described. These cyclic ethers have a very good ability to form cation complexes with salts of alkali metals, alkaline earth metals, $Cu^+$, $Ag^+$, $Au^+$, $NH_4^+$, $Hg^{2+}$, $Tl^+$, $Pb^{2+}$, $Ce^{3+}$, and this ability may be used in several different ways. The complexes are soluble in organic solvents, and alkali salts may be extracted from water solution to an organic solvent containing the cyclic ether. Thus, the ether may e.g. be used for removal of various salts from aqueous solutions, and the ether may also be used as a solvent or as an addition to solvents since the reactivity of the anion, deprived of its cation through the complex formation, is increased or modified. The structure of e.g. the sodium complex of the hexamer (the above formula with $n = 6$) may be illustrated as follows

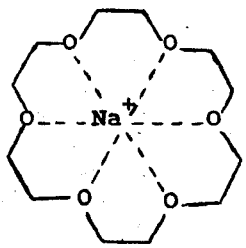

For the preparation of the cyclic polyethers relatively expensive starting materials are used according to said U.S. patent. Thus, the cyclic hexamer ($n = 6$) is prepared from the chlorohydrine of triethylene glycol by a two step process with a very poor yield.

Later an improved process has been found (J. Dale and P. O. Kristiansen. Chem. Commun. 1971, 670; Acta Chem. Scand. 26, 1471 (1972)) which for the preparation of the same hexamer starts from triethylene glycol and the bis-tosylate and gives the cyclic product by a one step reaction and in a much better yield. It is however obvious that only a direct process from the cheap petrochemical raw material ethylene oxide can make possible the large scale industrial preparation of these valuable cyclic ethers.

British Pat. No. 785,229 describes the conversion of ethylene oxide to the cyclic tetramer ($n = 4$) in the presence of trialkyl aluminium as catalyst. In this procedure dioxan ($n = 2$) and polymers are also formed, but none of the larger rings.

From U.S. Pat. No. 2,293,868 it is known to use acidic, fluorine-containing catalysts for the conversion of ethylene dioxide, but only to dioxan and polymers. From R. J. Kern, J. Org. Chem. 33, 388 (1968) it is known that the same catalyst may be used for conversion of propylene oxide to isomer mixtures of cyclic tetramers and pentamers. However, in the article it is clearly stressed that when ethylene oxide is treated under similar conditions only dioxan and the non-distillable semicrystalline polymer are formed.

We have now surprisingly found that under carefully controlled conditions it is possible, in the presence of certain per se known acidic fluorine-containing catalysts to convert ethylene oxide to a mixture of products consisting almost exclusively of cyclic oligomers. This mixture comprises both the larger rings for which the cation-complexing properties have been demonstrated, the cyclic tetramer, the previously unknown trimer, and dioxan.

Thus, according to the invention there is provided a process for preparing cyclic polyethers of the general formula

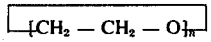

in which $n$ is an integer from 3 to 11, by oligomerisation of ethylene oxide in the presence of a catalyst, and the process is characterized in that the oligomerisation is carried out in the presence, as catalyst, of an acidic inorganic fluoride which is one fluoride anion short of forming a mono-anion of stable configuration, and in the absence of compounds which can provide potential terminal groups which will lead to the formation of linear polymers.

As mentioned it is important to ensure that neither the catalyst, any possible cocatalyst, nor solvent must be able to provide terminal groups for the formation of linear polymers. In previous publications (British Pat. No. 785,229 and R. J. Kern, J. Org. Chem. 33, 388 (1968)) this has not been understood or respected. Thus, a mixture of rings and polymers containing terminal ethoxy groups is obtained if e.g. $BF_3$ is added in the form of its diethyletherate, which in other connections is practical and permissible. Further, water and moisture will lead to the formation of polymers with terminal hydroxyl groups. The result will again be that mixtures of linear and cyclic polymers are obtained, which are difficult to separate. If diethylether is employed as solvent, the formation of macrocyclic ethers will be completely suppressed, and gas chromatography indicates that a homologous series of open chains has been formed. In a preferred process a catalytic amount of the acidic fluorine-containing catalyst is added to cooled pure ethylene oxide or a cooled solution in a suitable inert solvent which is then stirred well at atmospheric pressure with efficient cooling to prevent temperature rise. After neutralisation of the catalyst (e.g. with ammonia gas), the solvent is distilled off, and the cyclic products are separated by fractional distillation in vacuum. A preferred solvent is benzene, but other hydrocarbons may also be used. One may also use halogenated hydrocarbons such as carbon tetrachloride, and dioxan, which is one of the products. Saturated and halogenated hydrocarbons have the drawback that the catalyst is less readily dissolved and that insufficient cooling may result in gas evolution and a black precipitate due to dehydration of ethylene oxide by $BF_3$ to acetylene. The hydrated catalyst which is then formed, will cause the formation of open chains.

A particularly preferred catalyst is $BF_3$, but it has been observed that completely dry and pure $BF_3$, which would be the ideal with respect to avoiding introduction of terminal groups, has a relatively slow catalytic effect, although the products become particularly pure and free of polymer if the solvent is sufficiently basic (benzene, dioxan). It is known [D. J. Worsfold and A. M. Easthem, J. Am. Chem. Soc. 79, 900 (1957)] that water is an effective cocatalyst for the polymerisation of ethylene oxide with $BF_3$, but even when the water addition to the benzene solution is kept low, it is not possible to avoid polymer formation. Among other cocatalysts described [A. V. Topchiev, S. V. Zavgorodnii and Ya. M. Pauskin: Boron Fluoride and Its Compounds as Catalysts in Organic Chemistry (Pergamon Press 1959)] hydrogen fluoride was found to be in a particular position, since this cocatalyst accelerates the catalytic effect of $BF_3$ without leading to the formation of polymers. This is in conformity with the low nucleophilicity of the fluoride ion.

Among favourable catalyst systems which may be used are several similar fluorine compounds, having Lewis acid character, particularly $PF_5$ and $SbF_5$, alone or together with hydrogen fluoride. The ratio between the different products when $PF_5$ and $SbF_5$ are used, will be essentially the same as when $BF_3$ is used, except that considerably more trimer is formed. Several other known acidic catalysts containing oxygen such as sulphuric acid, sulphonic acids and perchloric acid are useless since they have a tendency to get irreversibly attached to ethylene oxide with permanent ring opening. Thus, with p-toluene sulphonic acid the mono-p-toluene sulphonic ester of ethylene glycol is formed. Other Lewis acids, such as $AlCl_3$ and $FeCl_3$, are ineffective alone, and in the presence of cocatalysts such as hydrogen chloride, the nucleophilic chloride ion will lead to a permanent opening or polymer formation. In some cases, as e.g. when using $SnCl_4$ and $SbCl_3$, a fast reaction is observed, but the product is gelatinous and waxy and does not contain any of the volatile ring systems ($n = 2-11$). It has not yet been completely established whether the product then consists of non-volatile ring compounds or open polymer chains.

The $BF_3.HF$ catalyst is so effective that the oligomerisation of ethylene oxide to larger rings takes place already at room temperature in 8–10 hours when the amount of catalyst is about 1%. The use of a solvent will primarily facilitate the temperature control.

It is also possible to control the temperature by adding ethylene oxide dropwise at a proper rate into a small volume of dioxan containing the catalyst. This permits the use of a higher reaction temperature which gives a faster conversion, but it is then observed that there is a greater tendency to acetylene formation and formation of cyclic acetals and relatively larger amounts of dioxan.

The following examples are given to illustrate the invention further. Examples 1–10 are according to the invention, while the other examples 11–14 illustrate how deviation from the invention results in more or less unsatisfactory results.

EXAMPLE 1

To an ice-cooled mixture of 400 ml dry benzene and 20 g ethylene oxide under a dry nitrogen atmosphere 0.2 g of boron trifluoride was added through a gas burette. A precipitation of ethyleneoxide-borontrifluoride adduct takes place, but this adduct is gradually dissolved during the subsequent stirring with magnetic stirrer. After 20 hours at 20°C the catalyst was neutralized with ammonia, and the solution was evaporated in a rotating evaporator to remove unreacted ethylene oxide, benzene and formed dioxan. The residue had a weight of 4 g and was a somewhat viscous liquid. The yield corresponds to 20% conversion. Gas chromatography showed, in addition to some unevaporated benzene and dioxan ($n = 2$), the presence of all homologues up to $n = 11$. Of these the tetramer, hexamer, heptamer and octamer ($n = 4, 6, 7$ and 8 respectively) were identified by gas chromatography of the reaction mixture to which authentic samples had been added. The timer ($n = 3$), which is hitherto unknown, was identified by mass spectrometry and later by isolation by preparative gas chromatography of the distillation fraction in question. It melts at 0°C, has broad IR absorption at 1150 and 2900 $cm^{-1}$ and characteristic lines at 830, 880, 910, 1005, 1065, 1255, 1300 and 1365 $cm^{-1}$ and a sharp NMR line at $\delta = 3, 7$. The weight ratio between the higher cyclic oligomers was for $n = 3,4,5,6,7$ as $1:7:4:3:3$.

EXAMPLE 2

To a mixture of 400 ml benzene and 18 g ethylene oxide there was added 0.3 g $BF_3$ and then 0.3 g HF. The reaction conditions were as in Example 1, except that the reaction time was 4 hours only. The evaporation residue, which consisted almost exclusively of the desired cyclic ethers, weighed 3.6 g.

EXAMPLE 3

About 0.2 g of phosphorus pentafluoride gas was passed into a cooled mixture of 21 g of ethylene oxide and 400 ml of benzene. After stirring for 18 hours the catalyst was neutralized with ammonia. The evaporation residue weighed 1, 8 g and contained the higher rings ($n = 3,4,5,6,7,8$) in the ratio $3:20:5:2:1:2$.

EXAMPLE 4

4 ml of a solution of phosphorus pentafluoride and HF in benzene/dioxan (corresponding to 0.7 g of $PF_5$ and 0.11 g of HF) was added to 200 ml of benzene, and 60 g of ethylene oxide were then added. After stirring for 18 hours neutralisation was carried out with ammonia. The evaporation residue weighed 8 g, and the ratio between the higher rings ($n = 3,4,5,6,7,8,9$) was $2:4:2:2:2:1:1$.

EXAMPLE 5

1 ml of antimony pentafluoride was added to a cooled mixture of 100 g of ethylene oxide in 400 ml of benzene. After stirring for 18 hours the catalyst was neutralized with ammonia. The evaporation residue weighed 17 g and contained the higher rings ($n = 3,4,5,6,7,8,9$) in the ratio $7:7:4:6:6:2:1$.

EXAMPLE 6

4 ml of a solution of antimony pentafluoride and HF in dioxan (corresponding to 1.6 g of $SbF_5$ and 0.16 g of HF) were added to 200 ml of benzene, and 67 g of ethylene oxide were then added. After stirring for 18 hours neutralisation was carried out with ammonia. The evaporation residue weighed 8 g, and the ratio between the higher rings ($n = 3,4,5,6,7,8,9$) was $8:9:6:5:3:2:1$.

EXAMPLE 7

In this and the subsequent examples 8–10 there was used a standard catalyst solution made by first absorbing 72 g of $BF_3$ gas and then 20 g of HF gas in 500 ml of dioxan. Thus, 7 ml of this solution contains 1 g of $BF_3$.

4 ml of this $BF_3$/HF dioxan solution and 66 g of ethylene oxide were added to 180 ml of dioxan. After stirring for 18 hours and neutralisation with ammonia the evaporation residue weighed 20 g. The product distribution was here completely displaced in the direction of the pentamer, the ratio of $n = 3,4,5,6,7,8,9,10$ being $12:16:22:14:10:4:2:1$.

EXAMPLE 8

4 ml of BF$_3$-HF dioxan solution were added to 400 ml of hexan and vigorous stirring (poor miscibility). Then 58 g of ethylene oxide were added, and stirring was continued for 22 hours (NB! if the stirring is stopped at an early time, gas liberation starts and a black coating is formed). The evaporation residue weighed 8 g and exhibited primarily the usual distribution of cyclic products and in smaller concentration a homologous series of open chains.

EXAMPLE 9

A mixture of 280 g of ethylene oxide, 300 g of benzene and 40 ml of BF$_3$—HF dioxan solution were stirred together at room temperature. Even at this concentration it was unnecessary with any cooling in addition to a water bath around the glass flask. After 8 hours neutralisation was carried out with ammonia. Gas chromatography indicated that 135 g of dioxan and 8.5 g of cyclic tetramer had been formed. The evaporation residue weighed 94 g and contained the higher cyclic oligomers ($n$ = 3,4,5,6,7) in the ratio 1:11:3:3:3.

EXAMPLE 10

An ice-bath cooled mixture of 80 g of ethylene oxide and 4 ml of BF$_3$—HF dioxan solution was stirred for 8 hours and neutralized with ammonia. The conversion was incomplete at this temperature, and gas chromatography indicated that 10 g of dioxan and 4 g of cyclic tetramer had been formed. The evaporation residue weighed 19 g and contained the higher cyclic oligomers ($n$ = 3,4,5,6,7,8) in the ratio 1:75:14:5:5:2.

EXAMPLE 11

0.3 g BF$_3$ was added to a cooled mixture of 600 ml benzene and 28 g ethylene oxide, and 0.09 g of water was then added. After 18 hours the catalyst was destroyed by means of NH$_3$, and benzene was evaporated off on a rotating evaporator. The evaporation residue weighed about 15 g. Upon standing the evaporation residue aquired a gelatinous waxy appearance which indicated the presence of high polymers. However, gas chromatography showed that lower boiling components were also present. This example illustrates that the increased reaction rate obtained by addition of water does not mean increased formation of the desired cyclic ethers, but of undesired polymers.

EXAMPLE 12

64 g of ethylene oxide were added to 1200 ml of benzene. 2 g of freshly distilled boron trifluoride diethyletherate were then added to the mixture. The residue after the evaporation of the reaction mixture weighed 15 g. Gas chromatography and NMR-spectroscopy showed that in addition to the homologous series of cyclic oligomers there had been formed open compounds having terminal ethoxy groups. The ratio by weight between individual cyclic oligomers was as previously, and between cyclic and open compounds as 1:1, in other words approximately half of the yield in comparison with Example 1 due to the presence of the ethyl ether.

EXAMPLE 13

2 g of boron trifluoride diethyletherate were added to 45 g of ethylene oxide in 800 ml of dry ether. (Reaction time and conditions were as in Example 1). The residue after evaporation of the reaction mixture weighed 18 g. Gas chromatography of the residue alone and the residue to which authentic cyclic oligomers had been added showed that the reaction mixture contained only a homologous series of open chains.

EXAMPLE 14

The reaction mixture (conditions as in Example 1) from 300 ml of benzene, 14 g of ethylene oxide and 0.5 g of SnCl$_4$ gave an evaporation residue of 4.2 g. The gelatinous and waxy residue was found by gas chromatography to have a higher molecular weight than the undecamer of ethylene oxide. It has not yet been established whether it consists of rings or open chains. This example illustrates that SnCl$_4$ is not an effective catalyst for the desired oligomerisation of ethylene oxide.

EXAMPLE 15

In analogy with Example 14, 300 ml of benzene, 16.9 g of ethylene oxide and 0.5 g of SbCl$_3$ gave an evaporation residue of 8.2 g. Gelatinous, waxy appearance.

We claim:

1. A process for preparing cyclic ethers of the formula:

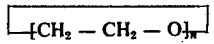

in which $n$ is an integer of from 3 to 11, by oligomerization of ethylene oxide, which process consists of conducting the oligomerization in the presence of a catlyst selected from the group consisting of boron trifluoride phosphorus pentafluoride and antimony pentafluoride and in the presence of benzene as an inert solvent said oligomerization being performed with cooling to a temperature of 20°C or less, and recovering said cyclic ethers.

2. Process according to claim 1, characterized in that the catalyst is boron trifluoride.

3. Process according to claim 1, characterized in that the catalyst is phosphorus pentafluoride.

4. Process according to claim 1, characterized in that the catalyst is antimony pentafluoride.

5. A process for preparing cyclic ethers of the formula:

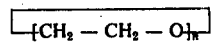

in which $n$ is an integer of from 3 to 11, by oligomerization of ethylene oxide, which process consists of conducting the oligomerization in the presence of a catalyst selected from the group consisting of boron trifluoride, phosphorous pentafluoride and antimony pentafluoride, with hydrogen fluoride as a co-catalyst and in the presence of benzene as an inert solvent, said oligomerization being performed with cooling to a temperature of 20°C or less, and recovering said cyclic ethers.

6. A process according to claim 5 wherein the catalyst is boron trifluoride.

7. A process according to claim 5, wherein the catalyst is phosphorus pentafluoride.

8. A process according to claim 5, wherein the catalyst is antimony pentafluoride.

* * * * *